United States Patent [19]

Waddill

[11] 4,141,885

[45] Feb. 27, 1979

[54] BIS UREIDE OF A POLYOXYALKYLENE POLYAMINE AS AN EPOXY ADDITIVE

[75] Inventor: Harold G. Waddill, Austin, Tex.

[73] Assignee: Texaco Development Corp., New York, N.Y.

[21] Appl. No.: 811,802

[22] Filed: Jun. 30, 1977

[51] Int. Cl.$^2$ .............................................. C08G 59/48
[52] U.S. Cl. ...................................... 528/93; 156/330; 528/111; 528/113; 260/823
[58] Field of Search .......... 260/47 EC, 78.41, 73.3 R, 260/47 EA

[56] References Cited

U.S. PATENT DOCUMENTS

| | | | |
|---|---|---|---|
| 3,324,176 | 6/1967 | Kirschnek et al. | 260/553 |
| 3,386,955 | 6/1968 | Nawakowski et al. | 260/47 |
| 3,717,612 | 2/1973 | Babayan | 260/47 EN |
| 4,002,598 | 1/1977 | Waddill | 260/47 EN |

Primary Examiner—Lester L. Lee
Assistant Examiner—E. A. Nielsen
Attorney, Agent, or Firm—James L. Bailey

[57] ABSTRACT

The resistance to thermal shock of anhydride cured epoxy resins is improved by the addition of a bis ureide of a polyoxyalkylene polyamine additive. The heat deflection properties of the epoxy resins are not appreciably compromised by the addition of the additive. The improved epoxy resin composition comprises a vicinal polyepoxide, an effective amount of a substituted bicyclic vicinal anhydride curing agent and an effective amount of a thermal shock resistance improving additive consisting essentially of a bis ureide of a polyoxyalkylene polyamine, said additive having an average molecular weight of at least 4,000.

7 Claims, No Drawings

BIS UREIDE OF A POLYOXYALKYLENE POLYAMINE AS AN EPOXY ADDITIVE

BACKGROUND OF THE INVENTION

Epoxy resins have a broad range of physical characteristics and, because of this, they are used in many industrial applications. Epoxy resins have at least one epoxy group which can be converted to a thermoset form having desirable properties. These epoxy groups may be cured by the use of a catalyst or a curing agent. The curing may be accelerated by the addition of small but effective amounts of accelerating agents.

There are many different types of curing agents which may be utilized. One class of curing agents which can be used are the anhydrides. The most common of these anhydride curing agents are the difunctional compounds such as maleic anhydride, phthalic anhydride and the like, as well as tetrafunctional materials such as pyromellitic dianhydride.

Ureas and substituted ureas have been utilized as epoxy curing agents, co-curing agents and curing accelerators. These urea and substituted urea compounds have been disclosed in U.S. Pat. Nos. 3,294,749; 2,713,569; 3,386,956; 3,386,955; 2,855,372; and 3,639,338.

Compounds having a single terminal ureido group have been disclosed in U.S. Pat. Nos. 2,145,242 and 3,965,072.

Epoxy resins which are used for casting, imbedding or encapsulating must have the ability to withstand repeated cycles of high and low temperatures without cracking. As the temperature decreases, the stress increases due to shrinkage since the lowering of the temperature reduces the ability of the resin to flow and relieve the stress.

Anhydride cured resins are most useful in applications requiring high heat deflection. However, anhydride cured resins are generally brittle and, thus, have a low resistance to thermal shock. Diluents and modifiers do improve the resistance to thermal shock; however, these materials adversely affect the heat deflection properties as shown in May and Tanaka, *EPOXY RESINS*, New York, 1973, p. 299. Similarly, plastisizers have not been widely used with epoxy resins because most are incompatible with the cured resins.

RELATED PATENT APPLICATIONS

U.S. Ser. No. 743,814 filed on Nov. 22, 1976 and jointly invented by Schulze and Waddill disclosed that a diureide terminated polyoxyalkylene material having a molecular weight of from about 2,000 to about 3,000 may be employed as an epoxy additive to improve the adhesive strength of amine cured epoxy resin compositions.

U.S. Ser. No. 743,877 filed on the same date and discovered by the same inventors as stated above, disclosed that the same additive as disclosed in the above referenced application was useful in enhancing the thermal shock resistance of an anhydride cured epoxy resin.

Each of the above related applications is incorporated by reference herein.

U.S. Ser. No. 743,815 filed on Nov. 22, 1976 and discovered by the same inventors as stated above, disclosed that an amine terminated polyether ureylene having a molecular weight of 4,000 to 4,500 may be employed as an epoxy additive-curing agent to improve the adhesive strength of epoxy resin compositions.

Filed concurrently herewith is U.S. Ser. No. 811,816 filed on June 30, 1977, discovered by H. G. Waddill, the same inventor herein. That application concerns the use of the same additives useful in the instant invention except those additives are used in amine cured epoxy resin compositions.

SUMMARY OF THE INVENTION

The thermal shock resistance of an epoxy resin cured with a substituted bicyclic vicinal anhydride is improved by the addition of an effective amount of an additive consisting essentially of a bis ureide of a polyoxyalkylene polyamine, said additive having an average molecular weight of at least 4,000.

The additive of the instant invention has the following formula:

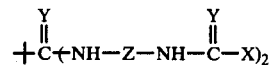

Where X is hydrogen or a primary amino group; Y is oxygen or sulfur; and Z is a polyoxyalkylene group having a sufficient molecular weight such that the additive has an average molecular weight of at least 4,000.

In one aspect of the instant invention there is provided a curable epoxy resin composition which comprises a vicinal polyepoxide; an effective amount of bicyclic vicinal anhydride curing agent of a Diels-Alder adduct of a substituted cyclopentadiene and maleic anhydride; and an effective amount of a thermal shock resistance improving additive consisting essentially of a bis ureide of a polyoxyalkylene polyamine, said additive having an average molecular weight of at least 4,000.

In a preferred aspect of the instant invention there is provided a bis (thio) polyoxypropylene diamine additive useful for improving the adhesive strength of an epoxy resin composition and this additive has a molecular weight of about 4,000.

DETAILED DESCRIPTION OF THE PREFERRED EMBODIMENTS

The thermal shock resistance of epoxy resins cured with a substituted bicyclic vicinal anhydride curing agent compositions may be improved by the addition of an effective amount an additive consisting essentially of a bis ureide of a polyoxyalkylene polyamine, said additive having an average molecular weight of at least 4,000. The preferred additive is a bis ureide of a polyoxypropylene diamine having an average molecular weight of about 4,000. The bis ureides of the instant invention are of the formula:

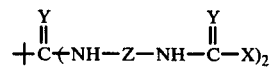

Wherein X is hydrogen of a primary amino group; Y is oxygen or sulfur; and Z is a polyoxyalkylene group having a sufficient molecular weight such that the additive has a molecular weight of at least 4,000.

It should be noted that the terminology "average molecular weight" is utilized with reference to many compositions described herein and in each instance that term is used because the weights of each molecule of the composition described may vary. Accordingly, that terminology provides a more accurate description of each composition.

The bis ureide compounds are formed by the reaction of urea or a mono-substituted urea compound with a polyoxyalkylene polyamine having a molecular weight such that the bis ureide product has a molecular weight of approximately 4,000. The reactants should be admixed in a molar ratio of 2 to 3; that is, 2 moles of the polyoxyalkylene polyamine to 3 moles of urea or a mono-substituted urea compound should be reacted. Generally, the reaction can take place at ambient pressure and at temperatures from 25° C. to about 150° C.

In a preferred embodiment of the instant invention the bis ureide additives are formed by reacting urea with polyoxyalkylene diamines of the formula:

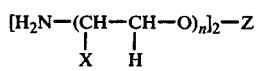

Wherein X is a hydrogen, a methyl radical or an ethyl radical; Z is an aklylene radical having from 2 to 5 carbon atoms; and n is a number from about 15 to about 25. A preferred diamine is polyoxypropylene diamine wherein X is a methyl radical, n is a number from 16 to 19 and Z is a 1,2-propylene radical. These polyoxyalkylene polyamines can be prepared in accordance with the methods disclosed in U.S. Pat. Nos. 3,236,895 and 3,654,370 and those patents are incorporated herein by reference.

As previously indicated, urea may be employed as a reactant with the polyoxyalkylene polyamine to produce the bis ureide additive. With urea as a reactant, ammonia evolves as the terminal primary amino groups of the polyoxyalkylene polyamine are converted to ureido groups.

Mono-substituted urea compounds can also be used as reactants. For example isocyanates of the formula R—N═C═O wherein R is either an aliphatic of aromatic monovalent radical.

Usually, a specific molar ratio of the reactants should be utilized. For example, when urea and a polyoxyalkylene diamine are utilized as the reactants, the ratio of urea to polyoxyalkylene diamine should be 3 moles to 2 moles, respectively. Generally, it is desirable to utilize a slight excess of the urea or mono-substituted urea compound in order to assure complete conversion of the amino groups of the polyoxyalkylene compound.

Thus, in the preferred embodiment, with urea and a polyoxypropylene (1,2-propylene) diamine having an average molecular weight of 2,000 as the reactants, one molecule of urea is needed to link two polyoxypropylene diamine molecules and two other molecules of urea are required to react with the terminal amino groups of the polyoxypropylene diamine.

Alternatively, the bis ureide additive may be prepared in a two step method. In the first step 2 moles of a polyoxyalkylene polyamine are reacted with 1 mole of urea or a mono-substituted urea compound. In the first step one molecule of urea links two of the polyoxyalkylene polyamine molecules. In the second step, the product of the first step may be reacted with urea in a molar ratio of 1:2 to form the bis ureide additive of this invention. In this second step the terminal amino groups of the product of the first step react with urea to form terminal ureido groups.

In accordance with this invention, an epoxy resin composition having improved thermal shock resistance may be prepared by admixing the following ingredients: a polyepoxide, an effective amount of a substituted bicyclic vicinal anhydride curing agent and an effective amount of an additive consisting essentially of a bis ureide of a polyoxyalkylene polyamine, said additive having an average molecular weight of at least 4,000. In addition to the ingredients listed above, an accelerator may be admixed with the curable resin composition in order to accelerate the cure.

The polyepoxides which may be used in accordance with this invention are vicinal compositions which can be amine cured and have an average of at least 1.8 reactive 1,2-epoxy groups per molecule. These polyepoxides can be monomeric or polymeric, saturated or unsaturated, aliphatic, cycloaliphatic, aromatic or heterocyclic, and may be substituted other than with epoxy groups. For example, these substituted substituents may be hydroxyl groups, ether radicals, aromatic halogen radicals and the like.

It is preferred to utilize glycidyl ethers which are prepared by epoxidizing the corresponding allyl ethers or by reacting a molar excess of epichlorohydrin and an aromatic polyhydroxy compound such as isopropylidene bisphenol, novolak, and resorcinol. In addition, the epoxy derivatives of methylene or isopropylidene bisphenols are preferred.

In accordance with this invention one class of polyepoxides which may be used are resinous epoxy polyethers which may be obtained by reacting an epihalohydrin with either a polyhydric phenol or a polyhydric alcohol. For example, suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane 2,3'-dihydroxydiphenylethylphenylmethane, 4-4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethane. Many other polyhydryic phenols may be co-reacted with epihalohydrin to provide these epoxy polyethers. These polyhydric phenols include resorcinol, hydroquinone, and substituted hydroquinones.

Many polyhydric alcohols can be co-reacted with epihalohydrin to provide the epoxy polyethers. For example, ethylene glycol, propylene glycols, butylene glycols, pentane diols, bis (4-hydroxycyclohexyl) dimethylmethane, 1,4-dimethylolbenzene, glycerol, 1,2,6-hexanetriol, trimethylpropane, mannitol, sorbitol, erythritol, pentaerythritol, their dimers, trimers and higher polymers, such as polyethylene glycols, polypropylene glycols, triglycerol, dipentaerythritol, polyallyl alcohol, polyhydric thioethers, such as 2,2'-, 3,3'-tetrahydroxydipropylsulfide, mercapto alcohols such as monothioglycerol and dithioglycerol, polyhydric alcohol partial esters such as monostearin, pentaerythritol, monoacetate, and halogenated polyhydric alcohols such as the monochlorohydrins of glycerol, sorbitol, and pentaerythritol.

Other polyepoxides which may be utilized in accordance with the instant invention include epoxy novolak resins obtained by reacting an epihalohydrin with the resinous condensate of an aldehyde and either a monohydric phenol or a polyhydric phenol, in the presence of a basic catalyst such as sodium or potassium hydroxide. Other information concerning the nature and preparation of these epoxy novolak resins may be obtained from Lee, H. and Neville, K. *Handbook of Epoxy Resins*, McGraw Hill Book Company, New York, 1967.

It should be understood by those skilled in the art that many polyepoxide compositions may be utilized in accordance with the instant invention. Accordingly, the above description of suitable polyepoxides was not intended to be limiting or exhaustive of all suitable polyepoxides; rather, it was intended to be exemplary of those polyepoxides which may be utilized in accordance with the invention.

The anhydride curing agents which may be utilized in accordance with the instant invention are generally the alkyl substituted bicyclic vicinal anhydrides such as the Diels-Alder adduct of maleic anhydride and a substituted cyclopentadiene. The preferred anhydride curing agents are of the following formula:

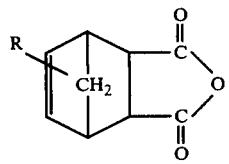

Wherein R is a lower alkyl and, preferably, a lower alkyl of from 1 to 4 carbon atoms. These preferred lower alkyl groups include methyl, ethyl, propyl, and n-butyl groups. The most preferred alkyl group is a methyl group. The most preferred anhydride is methylbicyclo (2,2,1) heptene-2,3-dicarboxylic anhydride.

Typically, anhydride cured epoxy resins are cured at elevated temperatures and, as previously indicated, accelerators may be used to speed the cure of the epoxy resin. Accelerators which may be utilized in accordance with the instant invention are well-known. For example, tertiary amines such as those disclosed in U.S. Pat. No. 2,839,480 may be utilized. It is preferred to use the dialkyl amine substituted aromatics and, preferably, the dimethyl amino methyl substituted phenols.

In accordance with this invention, it should be understood that the amount of the bis ureide additive required to improve the thermal shock resistance of the epoxy resin composition is empirical and is dependent upon many factors, such as the resin used, the curing agent used and the accelerator used, if one is used. Generally, the bis ureide additive can be utilized in amounts from about one to about forty parts by weight based on 100 parts by weight of the polyepoxide resin constituent.

Although the amount of bis ureide additive required to increase the thermal shock resistance of the resin is empirical, it can be determined by a reasonable amount of routine experimentation. Once an effective amount of the additive has been added to a resin mixture, the epoxy resin composition undergoes a readily visible change. Specifically, the resin becomes opaque and milky white in appearance and this change becomes more visible during the curing step. As a result of this change, the epoxy resin product has a lustrous white appearance. This optical absorption shift enhances the beauty of cast objects and negates the need to use white pigments or fillers.

Of course, if too small an amount of the additive is employed, the thermal shock resistance of the epoxy resin may not be improved. Similarly, if too great an amount of the additive is employed, other properties of the epoxy resin may be undesirably compromised.

The preferred epoxy resin compositions of the instant invention comprise polyglycidyl ethers of polyhydric phenols which are cured by admixing them with a curing amount of methyl bicyclo [2,2,1] heptene-2,3-dicarboxylic anhydride and a dimethyl amino methyl substituted phenyl accelerator.

The curable epoxy resin compositions of the instant invention comprise a vicinal polyepoxide, an effective amount of an alkyl substituted bicyclic vicinal anhydride curing agent and an effective amount of the bis ureide additive. If desired, an accelerator may be added.

The anhydride cured epoxy resin compositions of the instant invention having superior thermal shock resistance may be prepared in any suitable manner. The anhydride curing agent may be admixed with the polyepoxide in amounts according to the functional carboxyl equivalent weight of the curing agent employed. The number of equivalents of the carboxyl groups may vary from about 0.8 to about 1.2 times the number of epoxide equivalence present in the curable epoxy resin. It should be understood that from 0.9 to a stoichiometric amount is preferred. When an accelerator is employed, it may be admixed in amounts from about one to about ten parts by weight based on 100 parts by weight of the resin. Of course, it will be recognized by those in the art that the exact amount of each constituent will vary depending primarily on the intended application of the cured resin.

The bis ureide additive may be incorporated into the uncured resin by admixing. It is preferred that the additive be first admixed with the curing agent and accelerator, if one is used, prior to the addition of the polyepoxide resin. After this step, all of the constituents can be admixed in accordance with standard methods and degassed in the presence of a commercial defoamer and minute amounts of silicone oils. The degassing is required in order to prevent voids and bubbles in the cured resin.

Desirable properties of the cured epoxy resin compositions and especially the adhesive strength of the compositions, have been improved in those resin compositions containing polyglycidyl ethers of polyhydric phenols in amounts greater than 50 percent by weight of the polyepoxide resin constituent. Preferably, these polyhydric phenols are present in an amount of 80 percent by weight and even more preferably 100 percent by weight.

In accordance with a preferred embodiment of the instant invention, a curable epoxy resin composition comprises: a diglycidyl ether of a 4,4'-isopropylidene bisphenol; a curative amount of an anhydride curing agent consisting essentially of methyl bicyclo [2,2,1] heptene 2,3-dicarboxylic anhydride, an accelerator consisting essentially of dimethylaminomethyl substituted phenol; and, an effective amount of a thermal shock resistance improving additive consisting essentially of a bis ureide of a polyoxyalkylene polyamine, said additive having a molecular weight of at least 4,000.

In a preferred embodiment of the instant invention, the bis ureide of the above formulation consists essentially of a bis ureide of a polypropylene diamine having a molecular weight of approximately 4,000. Greatly preferred is the bis ureide additive which is an alpha, omega-bis ureide polyoxypropylene diamine having an average molecular weight of about 4,000.

A preferred ratio of constitutents comprises from about one to about ten parts by weight of an accelerator; from eighty to ninety parts by weight anhydride curing agent; and from one to forty parts by weight of the bis ureide additive wherein all of the above amounts are based on 100 parts by weight of the resin. Generally, the mixture of epoxy resin, the bis ureide additive, anhydride curing agent, and accelerator is allowed to self-cure at elevated temperatures up to about 200° C.

In accordance with a greatly preferred embodiment, the epoxy resins of the polyglycidyl ether of polyhydric phenols are cured by admixing them with from about eighty to ninety parts by weight of methyl bicyclo [2,2,1] heptene-2,3-dicarboxylic anhydride; from about one to forty parts by weight of the thermal shock resistance improving additive consisting essentially of a bis ureide of a polyoxypropylene diamine, said additive having a molecular weight of about 4,000; and from one to ten parts by weight of an accelerator consisting essentially of a dimethylaminomethyl substituted phenol. This composition may be cured at temperatures in the range of 100° C. to 190° C. to produce products having superior shock resistance.

In accordance with techniques well-known and understood in the art, other additives may be admixed with the polyepoxide compositions of the instant invention prior to curing. For example, it may be desirable to add minor amounts of other anhydride co-catalysts or hardeners or other accelerators and curing agents as are well-known in the art. In addition, pigments, dyes, fillers, flame retarding additives and other compounds, natural or synthetic, may be added.

Although it has been stated that the bis ureide of this invention has an average molecular weight of approximately 4,000, it should be recognized that this average weight is not without an upper limit. As should be apparent to those skilled in the art, as the molecular weight of the additive increases so does its viscosity. Thus, the upper limit of the average molecular weight will be a function of the viscosity of the bis ureide additive. Those skilled in the art will appreciate the undesirability of employing an additive having too high a viscosity.

Solvents for polyepoxides such as toluene, benzene, xylene, dioxane and ethylene glycol monomethylether may be utilized; however, they are not preferred.

The polyepoxide resins of the instant invention may be utilized in any application for which polyepoxide resin compositions are customarily employed. It should be understood that because of the white lustrous surface which the cured composition has, it may be of particular benefit in molding and casting procedures.

It should be appreciated by those of skill in the art, that compositions of the instant invention may be utilized as impregnates, surface coatings, pottings, capsulating compositions, laminants, and of particular importance, as adhesives for bonding metallic elements or structures together.

Surprisingly, smaller amounts of the bis ureide having an average molecular weight of at least 4,000 are required to improve the thermal shock resistance of epoxy compositions than are required when a bis ureide having an average molecular weight of 2,000 is utilized as an additive.

The following examples are illustrative:

EXAMPLE 1

In this example a bis ureide polypropylene diamine additive for use in accordance with this invention was prepared. The reactants which were utilized in a molar ratio of 2 to 3, respectively, were JEFFAMINE ® D-2000 made by Jefferson Chemical Company, Austin, Texas and urea.

Into a stirred reactor, 65 grams (1.08 moles) of urea and 500 grams of JEFFAMINE D-2000 were added. This admixture was heated to 135° C. flushed with nitrogen and stirred under a nitrogen pad for approximately two hours at the temperature of 135° C. After this two hour period the remainder of the JEFFAMINE D-2000 (935 grams) was slowly added while ammonia evolved.

After approximately seven hours at 135° C., the reaction product was vacuum stripped at 175°–180° C./2mm. Hg to produce a viscous residue which had a total amine content of 0.14 meq./g., a primary amine content of 0.05 meq./g. and 1.64% N.

To illustrate the advantage of the bis ureide additives of this invention, various epoxy formulations employing diglycidyl ether of 4,4-isopropylidene bisphenol were cured with various known anhydride curing agents. Where indicated a commercial accelerator was utilized. Three drops of silicone fluid were added to each formulation to prevent the formation of voids and bubbles. After degassing under vacuum, the formulations were cured under the conditions indicated. In appropriate examples, the cured products were subjected to standard American Society for Testing Materials (ASTM) test for Izod impact strength (ASTM designation D-256), flexural strength and modulus of elasticity in flexure (ASTM designation D-790-66), tensile strength and elongation at break (ASTM designation D-638-64 T), deflection temperature (ASTM designation D-648-56) and hardness (ASTM designation 2240-64T) and/or hardness Shore D. The abbreviations used in the table, pbw, psi and g. stand for parts by weight, pounds per square inch and grams, respectively.

EXAMPLES 2–6

The following examples show the resins employing the additives useful in accordance with the instant invention are resistant to thermal shock. In addition, these examples may be compared with Examples 6–15 in U.S. Ser. No. 743,877 in order to show that much smaller amounts of the additive of the instant invention are required to improve the thermal shock resistance than are required with the additive disclosed in that patent application.

The resins of these examples were prepared in accordance with the formulations shown in Table I below. Approximately 50 gram samples were utilized to encapsulate washers (1" o.d., ¾" i.d., 1/16" thick) supported by a ¼" ring of filter paper cut from Whatham 19 × 19 mm. cellulose extraction thimble. The encapsulations were formed in aluminum milk test evaporating dishes (5 cm. dia. × 1 cm deep). All samples were cured for two hours at 100° C., one hour at 130° C. and three hours at 150° C. Ten samples of each formulation were used and the results are shown in Table II below.

TABLE I

| Formulation | A | B | C | D | E |
|---|---|---|---|---|---|
| Epoxide, pbw (Eq. 190) | 100 | 100 | 100 | 100 | 100 |
| Curing agent, pbw[1] | 85 | 85 | 85 | 85 | 85 |
| Accelerator, pbw[2] | 2.5 | 2.5 | 2.5 | 2.5 | 2.5 |
| Bis ureide[3] | — | 0.5 | 1.0 | 2.0 | 5.0 |

[1]"Nadic Methyl Anhydride" sold by Allied Chemical Corporation, Morristown, N.J. 07960
[2]"DMP-10" sold by Rohm and Haas, Philadelphia, Pa. 19105
[3]Product of Example 1

TABLE II

| Number of samples cracked during cycles[4] | | | | | | | | | | | |
|---|---|---|---|---|---|---|---|---|---|---|---|
| Formulation | Ex. | 1 | 2 | 3 | 4 | 5 | 6 | 7 | 8 | 9 | 10 |
| A | 2 | 6 | 1 | 3 | —[5] | — | — | — | — | — | — |
| B | 3 | 0 | 4 | 0 | 1 | 0 | 0 | 1 | 0 | 0 | 1 |
| C | 4 | 1 | 1 | 0 | 0 | 0 | 0 | 0 | 0 | 0 | 0 |
| D | 5 | 2 | 1 | 0 | 0 | 0 | 1 | 0 | 0 | 0 | 0 |
| E | 6 | 2 | 3 | 0 | 0 | 0 | 0 | 0 | 0 | 0 | 0 |

[4]Thermal cycle: Oven at 140° C. (30 mins.), bath at −20° C. (15 mins.), room temperature (15 mins.). Examined for cracking and, if unchanged, recycled to oven.
[5]All 10 samples were cracked after cycle 3.

EXAMPLES 7–11

In these examples the epoxy resins were prepared by using phthalic anhydride as a curing agent and benzyldimethylamine as the accelerator. Those formulations are shown in Table III.

The cured resins were subjected to testing in accordance with the procedures utilized in Examples 2–11. Ten samples of each formulation were used and the test results are shown in Table IV. These results when compared to results in Examples XXXII–XLI in U.S. Ser. No. 743,877 illustrate that epoxy resins cured in accordance with the instant invention not only provide an improved thermal shock resistance over resins cured with phthalic anhydride but the resins also have improved thermal shock resistance over the resins cured in accordance with the above referenced patent application.

TABLE III

| Formulation[1] | A | B | C | D | E |
|---|---|---|---|---|---|
| Epoxy resin (Eq. 190), pbw | 100 | 100 | 100 | 100 | 100 |
| Phthalic anhydride, pbw | 75 | 75 | 75 | 75 | 75 |
| Benzyldimethylamine, pbw | 1 | 1 | 1 | 1 | 1 |
| Bis ureide, pbw[2] | 0 | 5 | 10 | 20 | 40 |

[1]Cure cycle: 2 hr. at 100° C., 1 hr. at 130° C., 3 hrs. at 150° C.
[2]Prepared in accordance with Example 1

TABLE IV

| Number of samples cracked during cycles[3] | | | | | | | | | | | |
|---|---|---|---|---|---|---|---|---|---|---|---|
| Formulation | Ex. | 1 | 2 | 3 | 4 | 5 | 6 | 7 | 8 | 9 | 10 |
| A | 7 | 6 | 2 | 0 | 0 | 0 | 1 | 0 | 0 | 0 | 0 |
| B | 8 | 10[4] | — | — | — | — | — | — | — | — | — |
| C | 9 | 5 | 1 | 4[4] | — | — | — | — | — | — | — |
| D | 10 | 1 | 4 | 0 | 0 | 1 | 1 | 0 | 0 | 0 | 0 |
| E | 11 | 0 | 0 | 0 | 0 | 0 | 0 | 0 | 0 | 0 | 0 |

[3]Thermal cycle: oven at 140° C. (30 mins.), bath at −20° C. (15 mins.), room temperature (15 mins.). Examined for cracking and, if unchanged, recycled to oven.
[4]All 10 samples were cracked after cycle.

EXAMPLES 12–14

In these examples hexahydrophthalic anhydride was used as the curing agent with benzyldimethylamine as an accelerator. Table V presents the formulations of the cured resins. Each of the cured resins was subjected to thermal shock resistance testing in accordance with the procedure outlined in Examples 2–11. The test results of each formulation are shown in Table VI below.

TABLE V

| Formulation | Formulation | | |
|---|---|---|---|
| | A | B | C |
| Epoxy resin (EEW 190), pbw | 100 | 100 | 100 |
| Hexahydrophthalic anhydride, pbw | 78 | 78 | 78 |
| Benzyldimethylamine, pbw | 1 | 1 | 1 |
| Bisureide, pbw[1] | 0 | 2 | 5 |

[1]Prepared in accordance with Example 1

TABLE VI

| Number of samples cracked during cycles | | | | | | | | | | | |
|---|---|---|---|---|---|---|---|---|---|---|---|
| Formulation | Ex. | 1 | 2 | 3 | 4 | 5 | 6 | 7 | 8 | 9 | 10 |
| A | 12 | 4 | 1 | 1 | 0 | 1 | 0 | 0 | 0 | 1 | 0 |
| B | 13 | 6 | 1 | 3 | — | — | — | — | — | — | — |
| C | 14 | 0 | 0 | 0 | 1 | 0 | 0 | 0 | 1 | 1 | 3 |

[1]Thermal cycle: oven at 140° C. (30 mins.), bath at −20° C. (15 mins.), room temperature (15 mins.). Examined for cracking and, if unchanged, recycled to oven.

In view of the preceding description, further modifications and alternative embodiments of the instant invention and will be apparent to those skilled in the art. Accordingly, the preceding description is to be construed as explanatory and illustrative only and as for the purpose of teaching and enabling those skilled in the art to practice this invention.

While the preferred embodiment of the above described invention is to be understood to be the best mode presently contemplated, it is by no means the only embodiment possible. The scope of the invention is defined by the following claims and by any equivalent modifications and variations that fall within the true spirit of the invention.

What is claimed is:

1. An epoxy resin composition produced from a curable admixture which comprises:
   a vicinal polyepoxide having an epoxide equivalency of greater than 1.8;
   an effective amount of a substituted bicyclic vicinal anhydride curing agent;
   an amount of a thermal shock resistance improving additive consisting essentially of a bis ureide of a polyoxalkylene polyamine, said additive having an average molecular weight of at least 4,000, and having a formula:

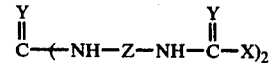

wherein X is a primary amino group; Y is oxygen or sulfur and Z is a polyoxyalkylene group.

2. The composition of claim 1 which further comprises an effective amount of a curing accelerator.

3. The composition of claim 2 wherein said vicinal polyepoxide is more than 80% by weight of a polyglycidyl ether of polyhydride phenols, and wherein said curing accelerator comprises a dialkyl amine substituted aromatic.

4. The composition of claim 3 wherein said vicinal polyepoxide is a polyglycidyl ether of a polyhydric phenol; and wherein said curing agent is methyl-bicyclo [2,2,1] heptene-2,3-dicarbxcylic anhydride.

5. A curable resin composition comprising a diglycidyl ether of 4,4'-isopropylidene bisphenol; an effective amount of a curing agent consisting essentially of methyl-bicyclo [2,2,1] heptene-2,3-dicarboxylic anhydride, a curing accelerator comprising dimethylaminomethyl substituted phenol; and an effective amount of a thermal shock resistance improving additive consisting essentially of a bis ureide of a polyoxyalkylene polyamine, said additive having an average molecular weight of at least 4,000, and having a formula:

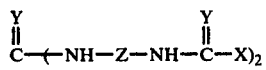

wherein X is a primary amino group; Y is oxygen or sulfur and Z is a polyoxyalkylene group.

6. The composition of claim 5 wherein said curing agent is present in an amount from about 80 to 90 parts by weight based on 100 parts resin, said accelerator is present in an amount from about 1 to 10 parts by weight based on 100 parts resin and said additive is present in an amount from about 1 to about 40 parts by weight based on 100 parts resin.

7. A method for increasing the thermal shock resistance of an epoxy resin composition, being the cured product of a curable admixture comprising a vicinal polyepoxide having an epoxide equivalency of greater than 1.8; and, an effective amount of a substituted bicyclic vicinal anhydride comprising the step of:

adding to said curable admixture an effective amount of a thermal shock resistance improving additive consisting essentially of a bis ureide of a polyoxyalkylene polyamine, said additive having an average molecular weight of at least 4,000, and having a formula:

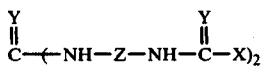

wherein X is a primary amino group; Y is oxygen or sulfur and Z is a polyoxyalkylene group.

* * * * *